(12) United States Patent
Cook et al.

(10) Patent No.: US 11,680,872 B2
(45) Date of Patent: Jun. 20, 2023

(54) WHEEL FORCE TRANSDUCER STATOR ANGLE CORRECTION DEVICE

(71) Applicant: Michigan Scientific Corporation, Milford, MI (US)

(72) Inventors: Andrew Cook, New Hudson, MI (US); Daniel Wheeler, Milford, MI (US); Stephan Barthel, Farmington, MI (US)

(73) Assignee: Michigan Scientific Corporation, Milford, MI (US)

( * ) Notice: Subject to any disclaimer, the term of this patent is extended or adjusted under 35 U.S.C. 154(b) by 10 days.

(21) Appl. No.: 17/329,702

(22) Filed: May 25, 2021

(65) Prior Publication Data

US 2021/0278318 A1 Sep. 9, 2021

Related U.S. Application Data

(63) Continuation of application No. 15/997,253, filed on Jun. 4, 2018, now Pat. No. 11,029,228.

(51) Int. Cl.
*G01M 17/013* (2006.01)
*G01L 25/00* (2006.01)
*G01L 5/16* (2020.01)

(52) U.S. Cl.
CPC ............. *G01M 17/013* (2013.01); *G01L 5/16* (2013.01); *G01L 25/00* (2013.01)

(58) Field of Classification Search
None
See application file for complete search history.

(56) References Cited

U.S. PATENT DOCUMENTS

| 9,476,800 B2 | 10/2016 | Olesky et al. | |
| 2010/0307240 A1* | 12/2010 | Tezuka | G01P 1/00 280/727 |
| 2016/0288566 A1 | 10/2016 | Randall et al. | |

FOREIGN PATENT DOCUMENTS

| CN | 101776525 A | 7/2010 |
| CN | 101968403 A | 2/2011 |
| CN | 103968976 A | 8/2014 |
| CN | 203929301 U | 11/2014 |
| CN | 205538092 U | 8/2016 |
| JP | 2009-244095 | * 10/2009 |
| JP | 2011-013012 | * 1/2011 |
| KR | 10 2011 0103233 A | 9/2011 |

* cited by examiner

*Primary Examiner* — Daniel S Larkin
(74) *Attorney, Agent, or Firm* — Young Basile Hanlon & MacFarlane, P.C.

(57) ABSTRACT

A stator angle is determined to correct a value measured by a wheel force transducer. A mounting bracket is rigidly attached to a vehicle and supports a housing within which a rotary encoder is mounted. A stator rod retainer is aligned with a rotational axis of the rotary encoder and has a through-bore extending perpendicular to the rotational axis. The stator rod retainer rotates relative to a stationary portion of the rotary encoder using at least one bearing, and the stator rod retainer supports a first end of a stator rod for substantially free movement through the through-bore. A controller determines, when the second end of the stator rod is fixedly attached to an encoder stator attached to a wheel, a stator angle of the stator rod used for adjusting at least one value associated with the wheel that is measured using the encoder stator.

20 Claims, 9 Drawing Sheets

WHEEL FORCE TRANSDUCER STATOR ANGLE CORRECTION DEVICE

CROSS-REFERENCE TO RELATED APPLICATION

This application is a continuation of U.S. patent application Ser. No. 15/997,253, filed Jun. 4, 2018, now U.S. Pat. No. 11,029,228, which is incorporated herein in its entirety by reference.

TECHNICAL FIELD

This disclosure relates to wheel force transducers and in particular to correcting measured values of a wheel force transducer using a stator angle.

BACKGROUND

Wheel force transducers (WFT), together with appropriate instrumentation, are used to measure forces or loads imparted on an associate rotatable member, such as a vehicle wheel, by the road during vehicle durability testing. A WFT system typically includes a 6-axis rotating transducer, a means for communicating signals from rotating to stationary, and a high-resolution rotary encoder comprised of a rotating component and a non-rotating component. The WFT system also includes a controller with a user interface that performs coordinate transformation and allows an operator to communicate with the transducer.

SUMMARY

An aspect of the disclosed embodiments is an apparatus that includes a mounting bracket configured for fixed attachment to a vehicle in a position spaced apart from a wheel of a vehicle, the mounting bracket supporting a housing, a rotary encoder mounted within the housing, and a stator rod retainer aligned with a rotational axis of the rotary encoder and having a through-bore extending perpendicular to the rotational axis, wherein the stator rod retainer is in mechanical communication with at least one bearing for rotation relative to a stationary portion of the rotary encoder, and the stator rod retainer is configured to support a first end of a stator rod for substantially free movement through the through-bore. A controller is associated with the rotary encoder configured to determine, when the second end of the stator rod is fixedly attached to an encoder stator attached to the wheel and the first end extends through the through-bore, a stator angle of the stator rod for adjusting at least one value associated with the wheel that is measured using the encoder stator.

Another aspect of the disclosed embodiments is a method that includes determining, using a controller associated with a rotary encoder, a stator angle of a stator rod. The rotary encoder is mounted within a housing supported by a mounting bracket, the mounting bracket is fixedly attached to a vehicle in a position spaced apart from a wheel of a vehicle, a stator rod retainer is aligned with a rotational axis of the rotary encoder and has a through-bore extending perpendicular to the rotational axis, the stator rod retainer is in mechanical communication with at least one bearing for rotation relative to a stationary portion of the rotary encoder, the stator rod retainer supports a first end of the stator rod for substantially free movement through the through-bore, and the second end of the stator rod is fixedly attached to an encoder stator attached to the wheel. The method also includes adjusting, using the stator angle, at least one value associated with the wheel that is measured using the encoder stator.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
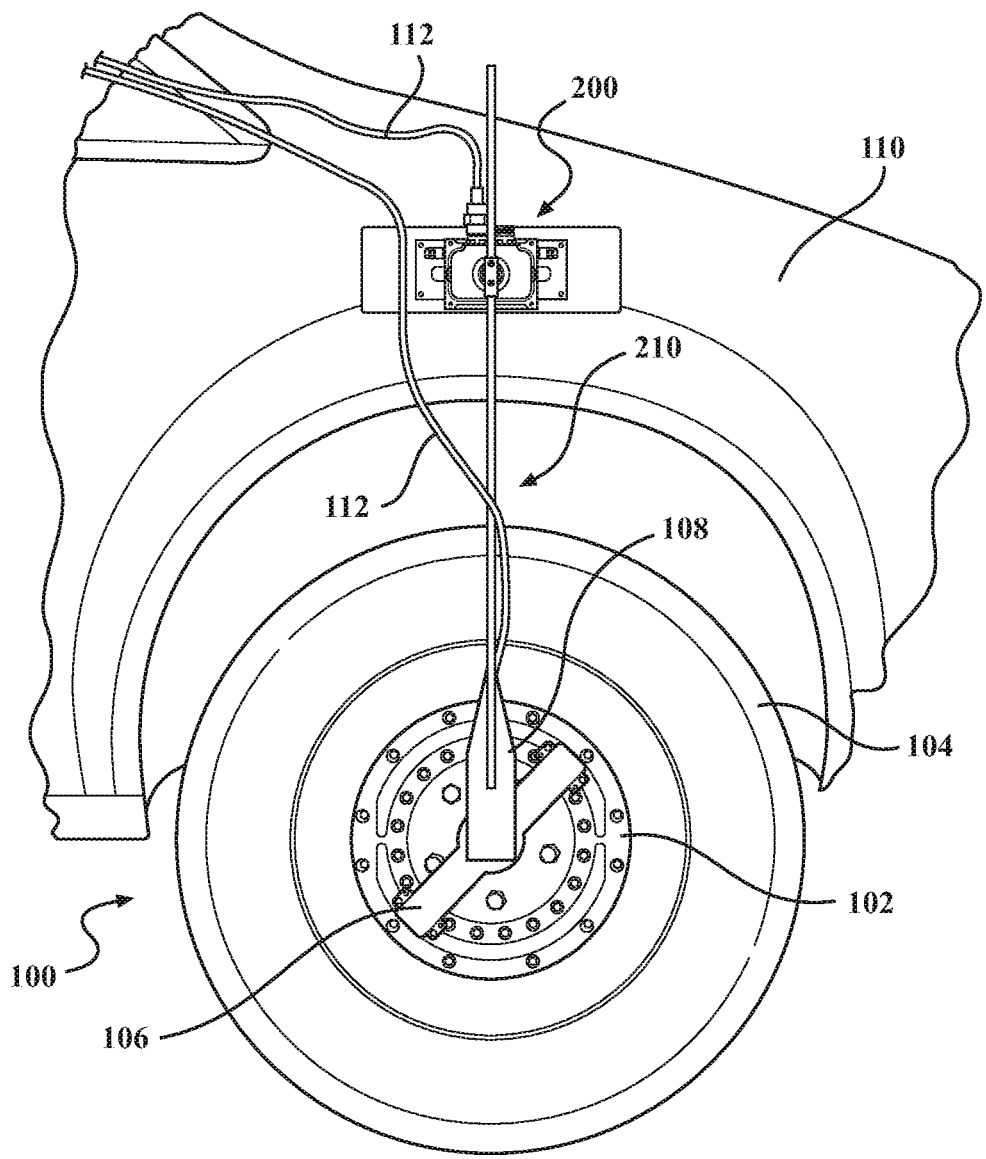
FIG. 1A is a front view of a wheel force transducer according to the principles of the present disclosure.
Figure 2A:
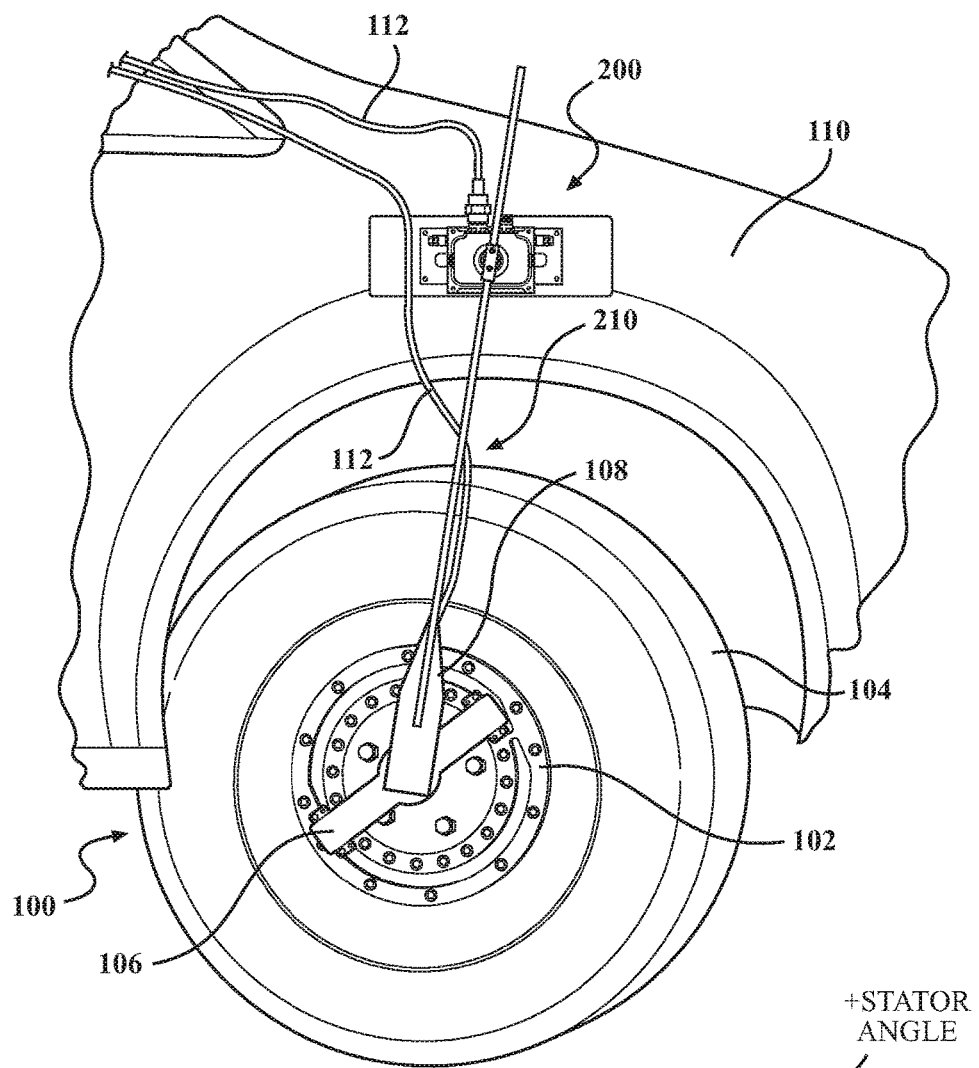
FIG. 2A is an alternate view of a wheel force transducer of FIG. 1A.

As described, wheel force transducers (WFT), together with appropriate instrumentation, are used to measure forces or loads imparted on an associate rotatable member, such as a vehicle wheel, by the road (e.g., during vehicle durability testing). FIGS. 1A and 2A illustrate a WFT system 100 according to the principles of the present disclosure. The WFT system 100 includes a load transducer 102 (e.g., a wheel force transducer). The load transducer 102 can be a 6-axis rotating transducer, or other suitable load transducer. The load transducer 102 may comprise an annular profile and be attached to an associated rotatable member or wheel 104 by any suitable means. The load transducer 102 includes a plurality of sensors. The plurality of sensors may include strain gages or other suitable sensors. The sensors are adapted to measure one or more forces or loads acting on the wheel 104, one or more moments associated with the wheel 104, and/or other suitable measurements associated with the wheel 104. In some embodiments, during vehicle durability testing, the sensors measure three primary forces acting on the wheel 104 (e.g., downward force, longitudinal force, and lateral force) and three primary corresponding moments of the wheel 104. In some embodiments, the one or more sensors may communicate an output signal corresponding to the one or more measured forces or loads acting on the wheel 104 to a controller, as will be described.

The WFT system 100 includes a rotary encoder 106. The rotary encoder is an example of a rotational measurement device. The rotary encoder 106 includes a rotor, which is a rotating portion that rotates with the wheel 104, and an encoder stator 108, which is a non-rotating, or stationary, part that is fixed to the vehicle body or, as will be described, to a stator angle correction device. The rotary encoder 106 may be referred to as the first rotary encoder 106. The rotary encoder 106 may include a high-resolution rotary position encoder, or other suitable device. The rotary encoder 106 is disposed on an outer portion of the load transducer 102 such that the rotary encoder 106, or a rotor associated with the rotary encoder 106, rotates with the load transducer 102 and the wheel 104. The encoder stator 108 can be attached to one or more fixtures. The encoder stator 108 and attached fixtures will be referred to as encoder stator 108. A first portion of the encoder stator 108 may be rigidly coupled or attached to a portion of the wheel 104, the rotary encoder 106, or the load transducer 102 using, for example, a bracket that allows a position of the encoder stator 108 to remain substantially stationary while the wheel 104, and consequently, the load transducer 102 and the rotary encoder 106, rotate. In some embodiments, a second portion of the encoder stator 108 may be coupled or attached to a portion of a vehicle 110, such as a portion of the body of the vehicle 110. In some embodiments, the encoder stator 108 may be coupled or attached to a bracket that extends over the wheel 104 and rigidly mounts to a steering knuckle or other part of a suspension of the vehicle 110.

The rotary encoder 106 is adapted to rotate with the rotation of the wheel 104. The rotary encoder 106 may include one or more sensors. The one or more sensors may include rotational position sensors or other suitable sensors. In some embodiments, at least one of the one or more sensors is adapted to measure a rotational position between the at least one sensor and the encoder stator 108. For example, as the wheel 104, and consequently, the rotary encoder 106 or a rotor associated with the rotary encoder 106, rotates, the at least one sensor passes the stationary position of the encoder stator 108. The at least one sensor is adapted to measure a current position of the at least one sensor relative to the encoder stator 108. The rotary encoder 106 is adapted to generate an analog or digital signal corresponding to the measured current position. The rotary encoder 106 communicates the signal corresponding to the current position to the controller. In some embodiments, the at least one sensor is adapted to continuously measure positions of the at least one sensor relative to the encoder stator 108. The rotary encoder 106 may communicate signals corresponding to respective current positions on demand, continuously, or at other suitable periods to the controller. The controller of the WFT system 100 may be referred to as a user interface controller herein to distinguish from the controller of the stator angle correction device 200 described later.

In some embodiments, the at least one sensor is adapted to capture, measure, or record a timestamp when the at least one sensor passes the stationary position of the encoder stator 108. The at least one sensor may be adapted to capture, measure, or record a timestamp for each measured position of the at least one sensor relative to the stationary position of the encoder stator 108. The rotary encoder 106, as described, is adapted to generate analog or digital signals corresponding to respective timestamps. The rotary encoder 106 is adapted to communicate the signals corresponding to respective captured, measured, or recorded timestamps to the user interface controller.

In some embodiments, the rotary encoder 106 is adapted to directly measure one or more wheel speeds of the wheel 104 and one or more rotational positions of the wheel 104 using the position of encoder stator 108. The encoder generates signals corresponding to respective wheel speeds of the wheel 104 and respective rotational positions of the wheel 104. The rotary encoder 106 may communicate the signals to the user interface controller.

The WFT system 100 may include the described user interface controller. The user interface controller may be any suitable computing device that includes a processor, memory, and/or other suitable computing components. The user interface controller is configured to receive, as described, the signals corresponding to the one or more measured forces or loads acting on the wheel 104 from the load transducer 102, the signals corresponding to measured positions of the rotary encoder 106 relative to the encoder stator 108, the signals corresponding to respective timestamps from the rotary encoder 106, other suitable signals, or a combination thereof. The load transducer 102 and the rotary encoder 106 may communicate signals to the user interface controller using any suitable technique. For example, the WFT system 100 may include one or more communications cables 112 connected to the load transducer 102, the rotary encoder 106, or both and to the user interface controller such that signals and other data may be passed from the load transducer 102 and the rotary encoder 106 to the user interface controller.

The user interface controller is adapted to determine one or more rotary positions of the wheel 104, one or more wheel speeds of the wheel 104, and/or other suitable characteristics of the wheel 104 based on the signals corresponding to the current positions of the rotary encoder 106 relative to the encoder stator 108 and the signals corresponding to the respective timestamps. Additionally, or alternatively, the user interface controller is adapted to perform coordinate transformation on the forces or loads acting on the wheel 104 based on the signals received from the load transducer 102. For example, the user interface controller receives signals corresponding to the three primary forces acting on the wheel 104 and signals corresponding to the three moments corresponding to the three primary forces, as described below. In some embodiments, the user interface controller receives signals corresponding to the wheel speeds of the wheel 104 and the rotational positions of the wheel 104.

Figure 1B:
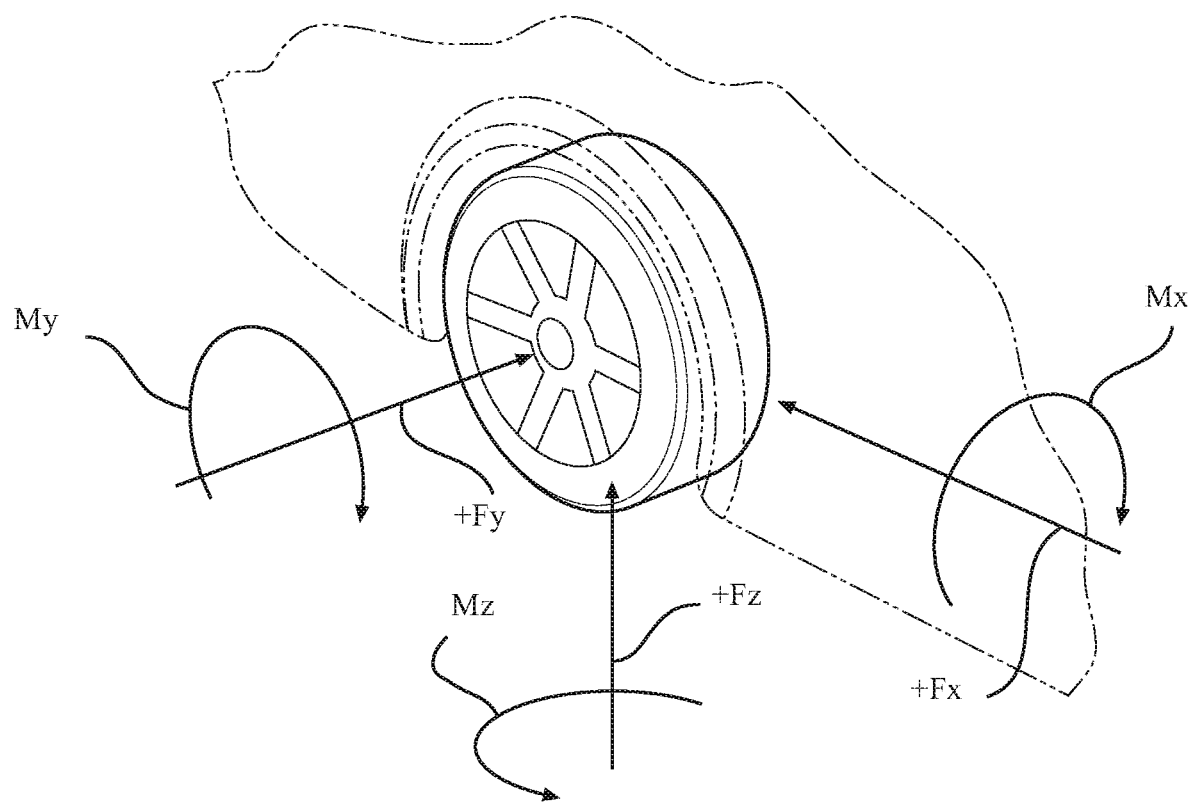
FIG. 1B generally illustrates a vehicle coordinate system according to the principles of the present disclosure.

The user interface controller performs coordinate transformation to organize the forces acting on the wheel 104 in an x, y, and z coordinate system, which may be referred to as a vehicle coordinate system, as is generally illustrated in FIG. 1B. The vehicle coordinate system may include a force Fy along the y-axis and a corresponding moment My about the y-axis, a force Fx along the x-axis and a corresponding moment Mx about the x-axis, and a force Fz along the z-axis and a corresponding moment Mz about the z-axis.

In some embodiments, the user interface controller may communicate the vehicle coordinate system, values associated with the forces and moments acting on the wheel 104, values associated with the one or more rotary wheel positions associated with the wheel 104, one or more wheel speeds of the wheel 104, other characteristics of the wheel 104, or a combination thereof to a data recorder. The user interface controller may be implemented by a computing device, such as a laptop computer, a desktop computer, a mobile computing device (e.g., a smartphone or tablet), other suitable computing device, or a combination thereof. The WFT system 100 is adapted to allow a user to review and analyze forces and moments acting on the wheel 104. The analysis of the forces and moments acting on the wheel 104 may be used to analyze durability of various components of the vehicle 110.

As described above, the encoder stator 108 is the non-rotating portion of the rotary encoder 106. The rotating portion of the rotary encoder 106 is rigidly attached to a portion of the load transducer 102 or the wheel 104. A second portion of the encoder stator 108 may be rigidly coupled or attached to a portion of the body of the vehicle 110 or a portion of the suspension of the vehicle 110. By rigidly positioning the encoder stator 108, the encoder stator 108 remains substantially stationary, which allows the rotary encoder 106 to use the encoder stator 108 as a reference point for the above-described measurements. For example, the encoder stator 108 may be positioned substantially parallel to the z-axis of the vehicle coordinate system (e.g., the encoder stator 108 may be vertically positioned). However, the encoder stator 108 may tip relative to the z-axis (e.g., become non-vertical). For example, when the wheel 104 is steered as shown in FIG. 2A, the wheel 104 travels in an arcuate direction that may cause the encoder stator 108 to tip from the vertical position.

Figure 2B:
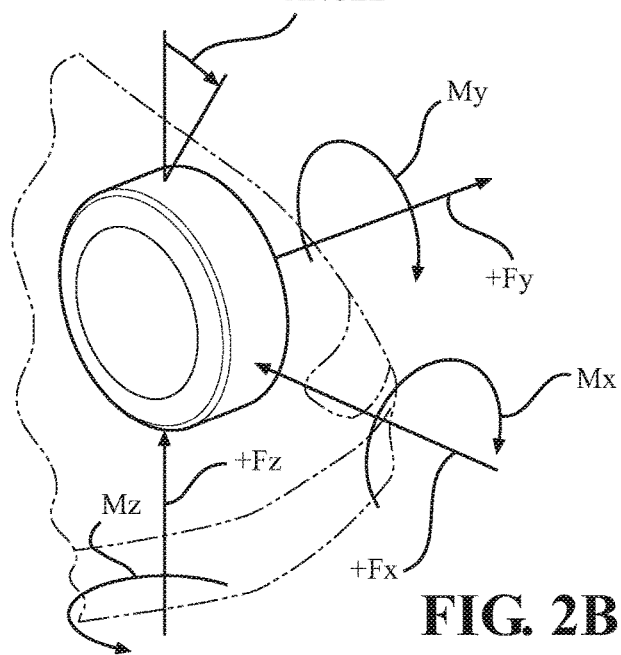
FIG. 2B generally illustrates a stator angle relative to the vehicle coordinate system of FIG. 1B.
Figure 3:
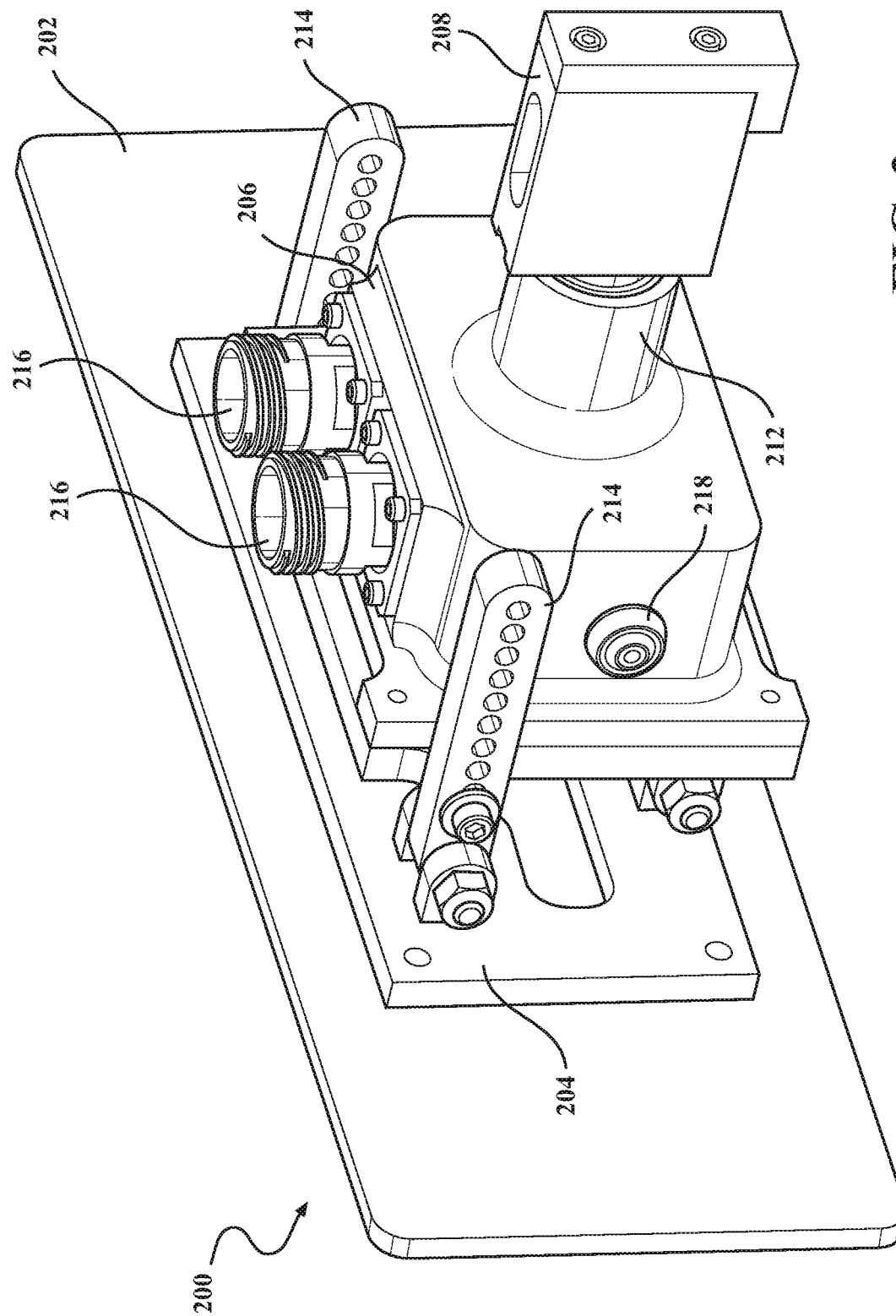
FIG. 3 is a perspective view of a wheel force transducer stator angle correction device according to the principles of the present disclosure.
Figure 4:
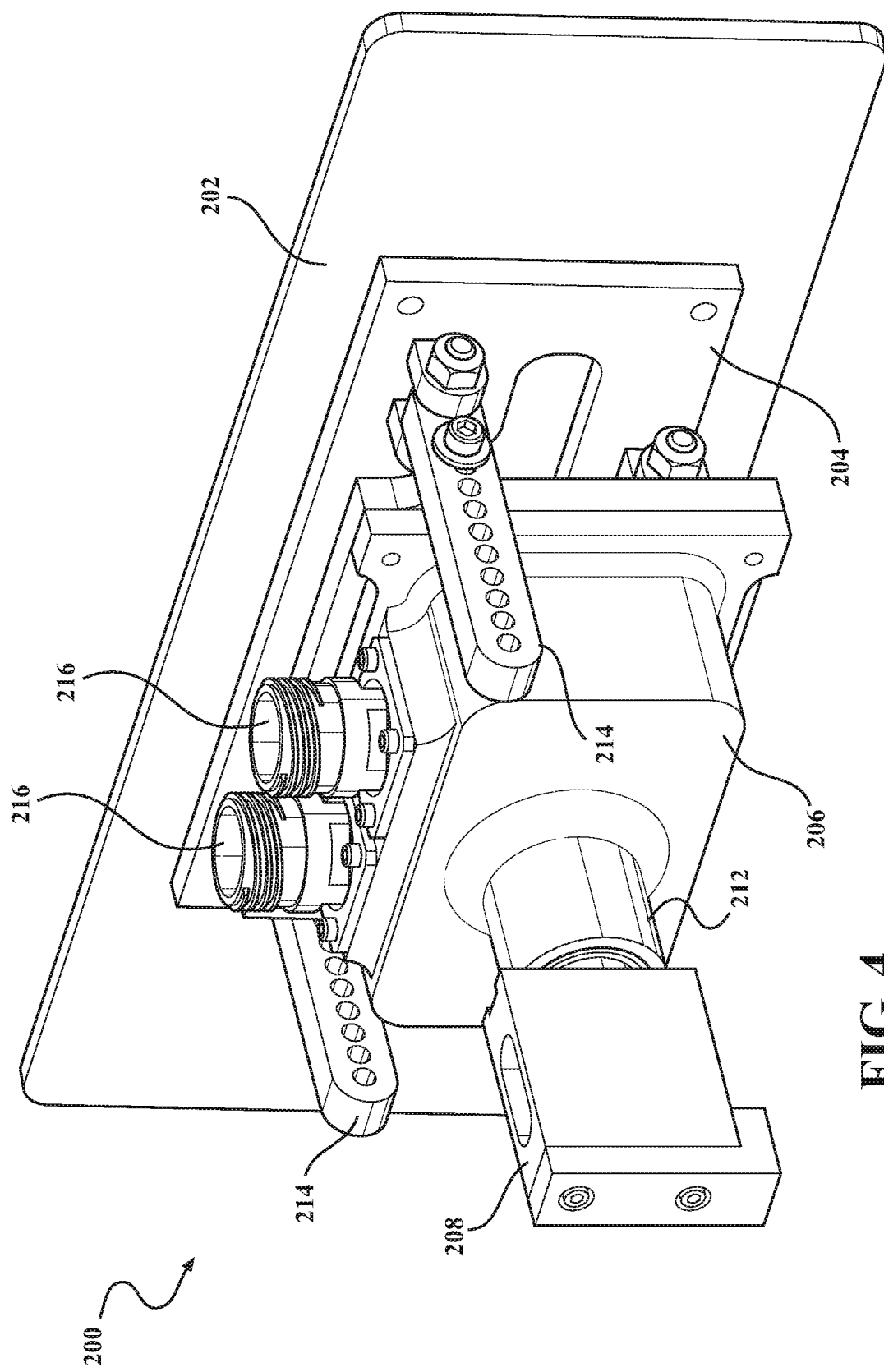
FIG. 4 is a perspective view of the wheel force transducer stator angle correction device of FIG. 3.
Figure 5:
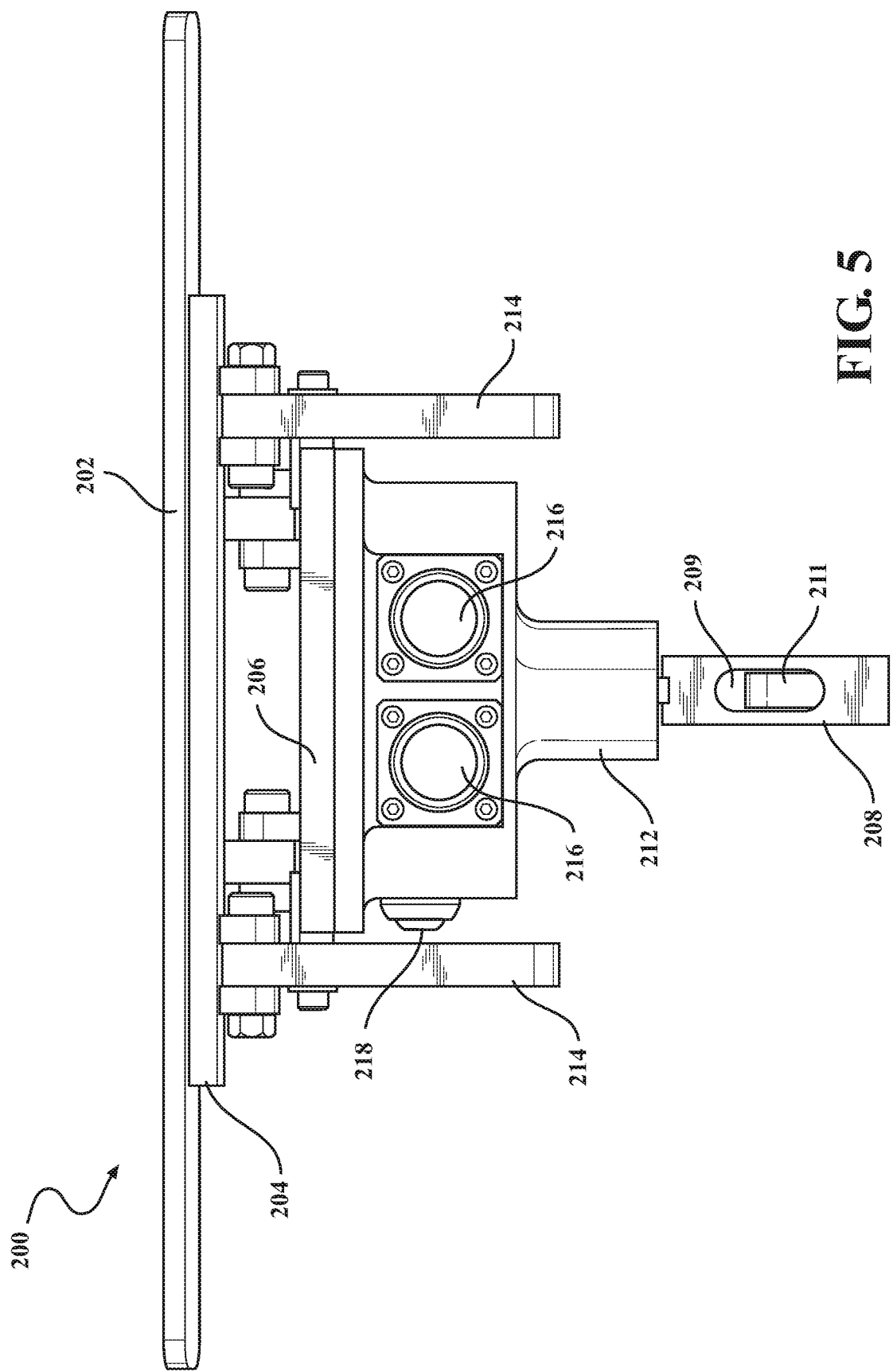
FIG. 5 is a top view of the wheel force transducer stator angle correction device of FIG. 3.
Figure 6:
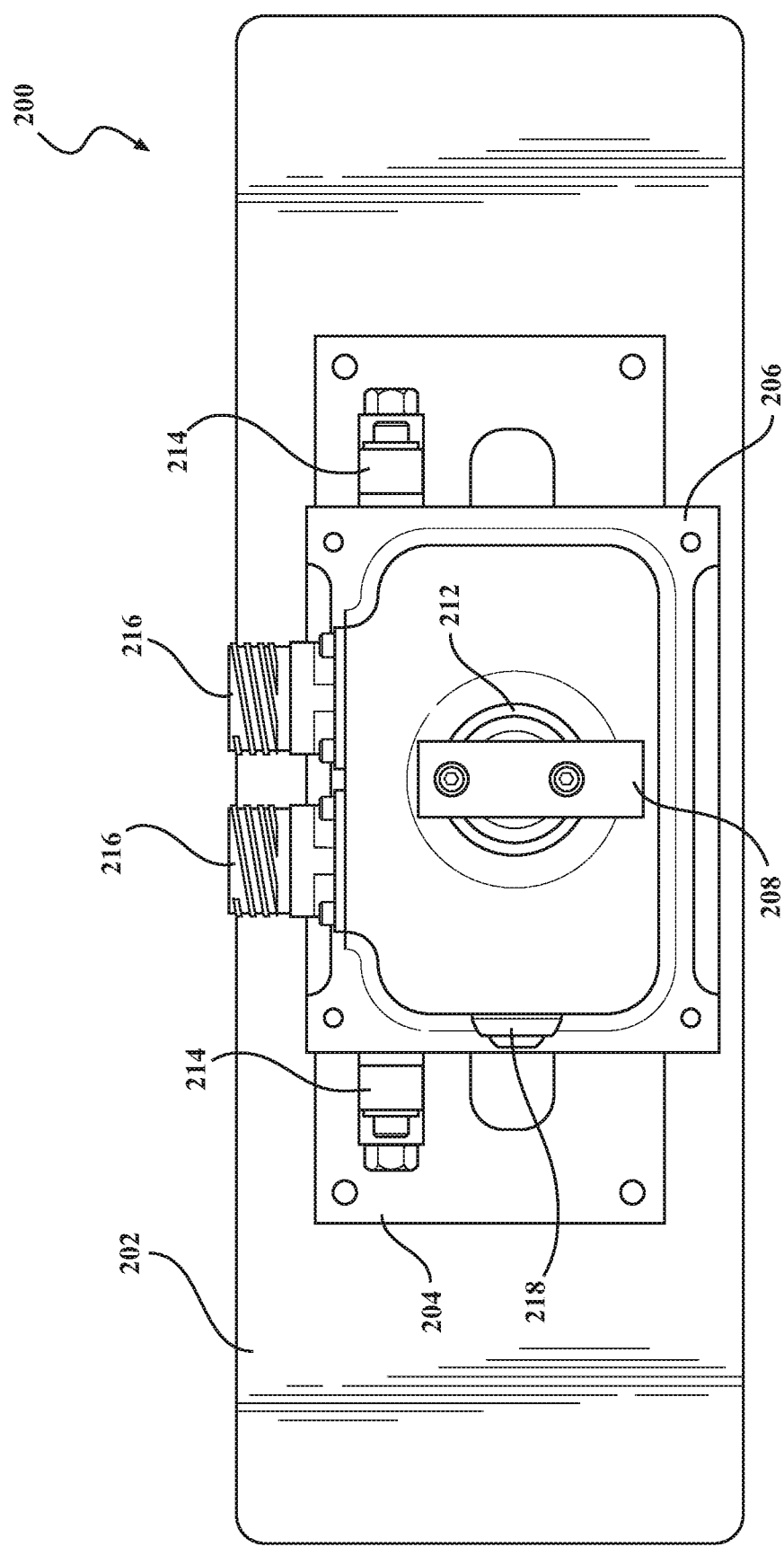
FIG. 6 is a front view of the wheel force transducer stator angle correction device of FIG. 3.
Figure 7:
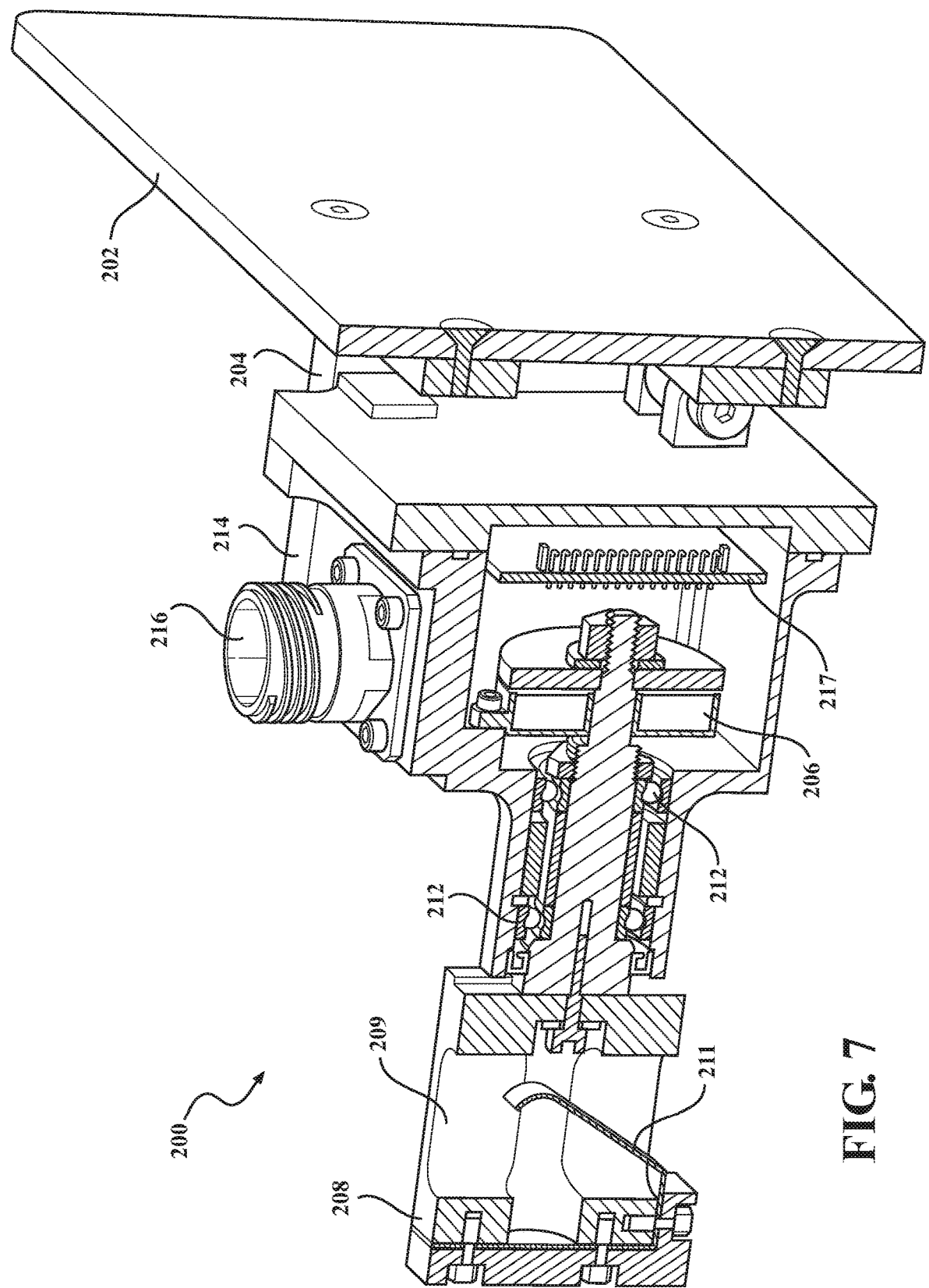
FIG. 7 is a cutaway view of the wheel force transducer stator angle correction device of FIG. 3.

FIG. 2B generally illustrates a stator angle relative to the vertical position created when the encoder stator 108 is tipped and becomes non-vertical. Because the force and moment determinations, described above, assume the encoder stator 108 is statically disposed in the z-axis direction, the forces and moments determined by the user interface controller may be inaccurate. Additionally, or alternatively, the forces and moments organized in the vehicle coordinate system may be inaccurately represented.

In some embodiments, the WFT system 100 may be used with a wheel force transducer stator angle correction device 200 ("SAC device 200"). The SAC device 200 may be referred to as a wheel force transducer steering angle compensator ("WFT SAC"). The SAC device 200 may be referred to as a SAC apparatus 200 or a SAC module 200. The SAC device 200 is adapted to measure an angle of the encoder stator 108 during operation. In some embodiments, the SAC device 200 intercepts the signals corresponding to the forces and moments communicated by the load transducer 102 before the signals reach the user interface controller. The SAC device 200, as will be described, adjusts the signals corresponding to the wheel speed and wheel rotational position from rotary encoder 106 based on the measured angle of the encoder stator 108. The correction of the wheel rotational position signal before coordinate transformation in the user interface controller prevents inaccuracy or inaccurate representation of the forces and moments as the encoder stator 108 becomes non-vertical while the wheels of the vehicle are steered. The in-line adjustment of the wheel rotational position signal inside the SAC device 200 corrects the rotary encoder 106 signal such that it stays substantially vertical throughout the vehicle durability testing, preventing inaccuracy or inaccurate representation of the forces and moments. For example, the SAC device 200 may adjust the wheel speed and wheel rotational position, described above, according to the following:

$$WRP(adjusted) = WRP + SA * M \quad (1)$$

$$WS(adjusted) = WS + SS \quad (2)$$

With respect to equation (1), wheel rotation position WRP is the rotation position of the wheel 104 as measured by the rotary encoder 106. Stator angle SA is the change in the angle of the encoder stator 108 as measured in SAC device 200. M is a factor that may be used to adjust the stator angle to account for out-of-plane wheel travel with respect to stator angle. WRP(adjusted) is the adjusted rotation angle of the wheel 104 as output from the SAC device 200. With respect to equation (2), wheel speed WS is the rotation speed of the wheel 104 as measured by the rotary encoder 106. Stator speed SS is the change in speed of the encoder stator 108 as measured in the SAC device 200. WS(adjusted) is the adjusted rotation speed of the wheel 104 as output from the SAC device 200.

FIGS. 3-7 generally illustrate the SAC device 200. The SAC device 200 includes a vehicle mount 202. The vehicle mount 202 is adapted to rigidly connect or attach the SAC device 200 to a portion of the vehicle 110. For example, the vehicle mount 202 is adapted to rigidly attach the SAC device 200 to a fender of the vehicle 110. The vehicle mount 202 may connect or attach the SAC device 200 using any suitable technique. For example, the vehicle mount 202 may include a temporary or permanent adhesive that engages the portion of the vehicle 110 and rigidly connects or attaches the SAC device 200 to the portion of the vehicle 110. In some embodiments, the vehicle mount 202 may be mechanically secured to the portion of the vehicle 110. For example, the vehicle mount 202 may be riveted, screwed, bolted, or otherwise mechanically secured to the portion of the vehicle 110 using other suitable techniques. In some embodiments, the vehicle mount 202 may comprise a magnet or magnetic material adapted to secure the SAC device 200 to the vehicle using magnetic forces.

The SAC device 200 includes a mounting bracket 204. The mounting bracket 204 is adapted to rigidly mount components of the SAC device 200 to the vehicle mount 202 using any suitable technique. For example, the mounting bracket 204 may be mechanically secured to the vehicle mount 202 as described above.

The SAC device 200 includes a rotary encoder 206 and a stator rod retainer 208. The stator rod retainer 208 is adapted to receive a portion of a stator rod 210, as is generally illustrated in FIGS. 1A and 2A. A first portion of the stator rod 210 is adapted to be rigidly connected or attached to a portion of the encoder stator 108. A second portion of the stator rod 210 is adapted to be received in a through-bore 209 of the stator rod retainer 208. In some embodiments, the stator rod retainer 208 includes a cantilever sheet metal spring 211 disposed within the through-bore 209. The cantilever sheet metal spring 211 is adapted to limit or control movement of the stator rod 210 in the through-bore 209. During operation, the first portion of the stator rod 210 remains rigidly connected or attached to the encoder stator 108 and the second portion of the stator rod 210 moves substantially freely through the through-bore 209 of the stator rod retainer 208. For example, when the wheel 104 is steered, the first portion of the stator rod 210 moves with the encoder stator 108. A distance between the encoder stator 108 and the stator rod retainer 208 increases as the wheel 104 is steered. Accordingly, the second portion of the stator rod 210 moves within the through-bore 209 of the stator rod retainer 208 to accommodate the change in distance between the encoder stator 108 and the stator rod retainer 208.

The stator rod retainer 208 is adapted to rotate with respect to the rotary encoder 206. For example, the stator rod retainer 208 may be mechanically coupled to one or more bearings 212. The bearings 212 are disposed on a portion of the rotary encoder 206. The bearings 212 may include any suitable bearings. The bearings 212 allow the stator rod retainer 208 to rotate with respect to the stationary portion of the rotary encoder 206. As described, the first portion of the stator rod 210 moves with the encoder stator 108 when the wheel 104 is steered. As the wheel 104 is steered, the second portion of the stator rod 210 moves within the through-bore 209 of the stator rod retainer 208. As the stator rod 210 moves within the through-bore 209 of the stator rod retainer 208, the stator rod retainer 208 rotates on the bearings 212 with respect to the rotary encoder 206. The movement of the stator rod retainer 208 corresponds to the angular movement of the encoder stator 108 resulting from the wheel 104 being steered. Accordingly, the angle of the stator rod retainer 208 with respect to the rotary encoder 206 corresponds to the stator angle of the encoder stator 108, described above.

The rotary encoder 206 is adapted to measure the angle of the stator rod retainer 208, as described. The rotary encoder 206 may be referred to as a second encoder. The rotary encoder 206 may include a high-resolution rotary encoder or other suitable rotation measurement devices. The rotary encoder 206 may be connected or attached to the mounting bracket 204 using various brackets or other suitable mechanisms. A position of the rotary encoder 206 relative to the vehicle 110 may be adjustable. For example, the rotary encoder 206 may be connected or attached to the mounting bracket 204 using one or more adjustable brackets 214. The SAC device 200 includes a controller 217. The controller 217 may include any suitable controller, as described. The controller 217 may intercept the signals corresponding to the forces and moments acting on the wheel 104 from the load transducer 102. Additionally, or alternatively, the controller 217 may intercept the wheel speed and wheel rotational position from the first rotary encoder 106. The controller 217 may then adjust the wheel speed and wheel rotational position signals while not modifying the force and moment signals. For example, the SAC device 200 includes one or more communications ports 216. A communications cable, as described, may connect one of the communications ports 216 to the load transducer 102. The controller 217 adjusts the values of the wheel speed and wheel rotation position signals using the above described equations (e.g., using the stator angle). The controller 217 generates signals corresponding to the adjusted wheel speed and wheel rotational position of the wheel 104. The controller 217 communicates the signals to the (e.g., user interface) controller, as described above. A communications cable may connect another of the communications ports 216 to the user interface controller. In some embodiments, the controller 217 generates a signal corresponding to the measured stator angle. The controller 217 communicates the measured signal to the user interface controller. In some embodiments, the user interface controller may be adapted to adjust the force values and the moment values using the measured stator angle corresponding to the signal communicated by the controller 217.

In some embodiments, the SAC device 200 includes a relative position mechanism 218. The relative position mechanism 218 may include a button or other actuating device for activating the relative position mechanism 218. The relative position mechanism 218, when activated, adjusts the rotary encoder 206 to account for a current position of the stator rod retainer 208 (e.g., to zero-out the rotary encoder 206).

As described, the user interface controller may use the adjusted wheel speeds, and the adjusted wheel rotational positions to perform the coordinate transformation. The user interface controller may communicate the forces, the moments, the adjusted wheel speeds, the adjusted rotational positions, and the adjusted vehicle coordinate system resulting from the coordinate transformation to a data recorder.

Figure 8:
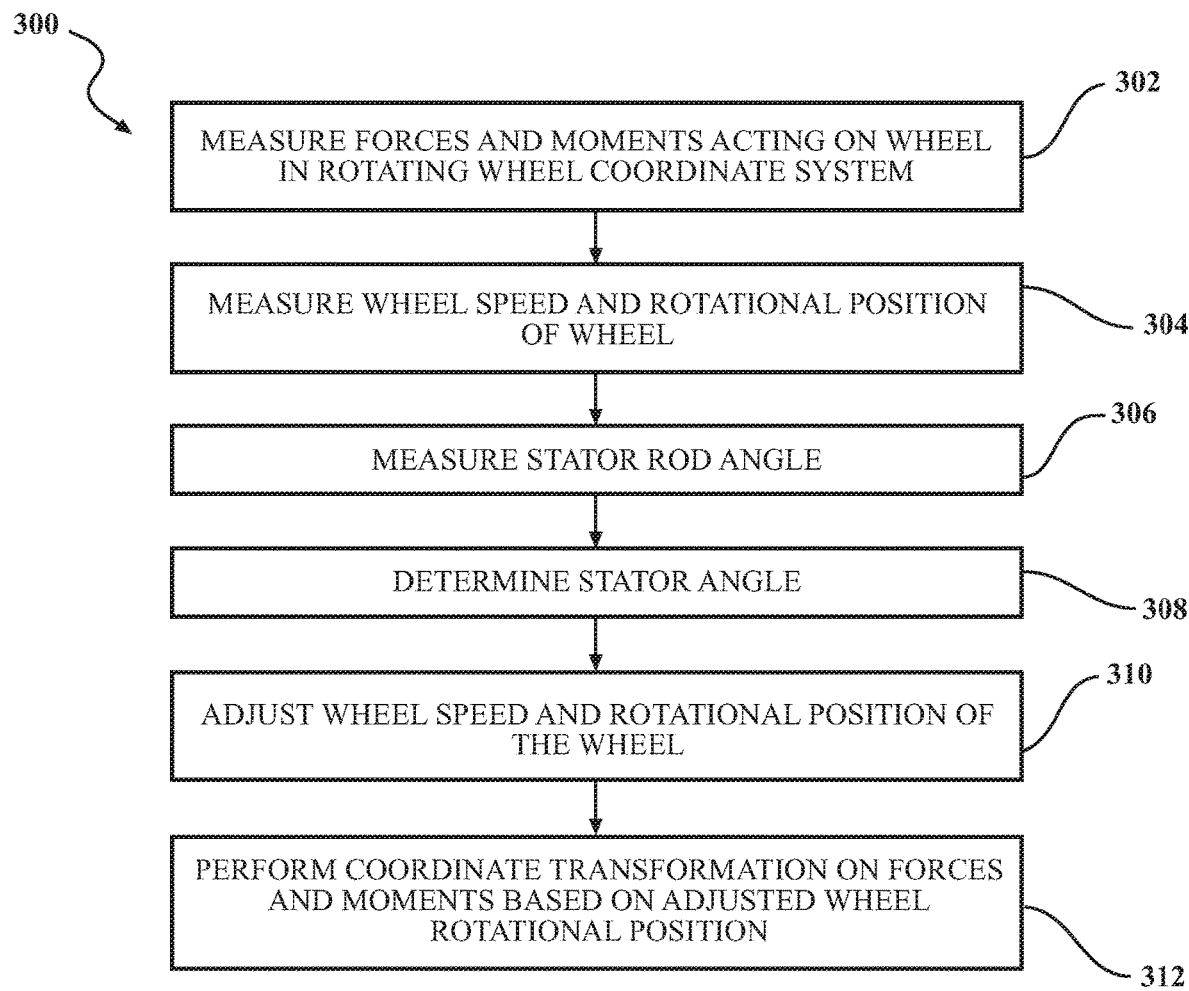
FIG. 8 is a flow diagram illustrating a wheel force transducer stator angle correction method according to the principles of the present disclosure.

FIG. 8 is a flow diagram illustrating a wheel force transducer stator angle correction method 300 according to the principles of the present disclosure. At 302, the method 300 measures forces and moments acting on a wheel, such as the wheel 104 in a rotating wheel coordinate system. As described, the load transducer 102 determines three primary forces acting on the wheel 104 and three primary moments corresponding to the three primary forces acting on the wheel 104. The load transducer 102 may generate signals corresponding to the forces and moments acting on the wheel 104. The load transducer 102 communicates the signals to the user interface controller. At 304, the method 300 measures wheel speed and wheel rotational position of the wheel 104. For example, as described, the rotary encoder 106, using the encoder stator 108, determines one or more wheel speeds of the wheel 104 and one or more rotational positions of the wheel 104. The rotary encoder 106 generates signals corresponding to respective wheel speeds of the wheel 104 and respective rotational positions of the wheel 104. The rotary encoder 106 may communicate the signals to the user interface controller, as described.

At 306, the method 300 measures a stator rod angle. As described, the SAC device 200 measures an angle of the stator rod 210 (e.g., as the wheel 104 is steered). At 308, the method 300 determines a stator angle. As described, the stator angle corresponds to the measured angle of the stator rod 210. At 308, the method 300 adjusts wheel speed and wheel rotational position signal while allowing signals corresponding to the force and moment acting on the wheel to pass through to the user interface controller unmodified. For example, as described, the SAC device 200 intercepts the signals corresponding to the forces and moments acting on the wheel 104 as well as the wheel speed and wheel rotational position of the wheel 104. The SAC device 200 adjusts the values of wheel speed and wheel rotational position using the stator angle. The SAC device 200 generates signals corresponding to the adjusted values of the wheel speed and wheel rotational position and well as the unmodified signals for the forces and moments acting on the wheel 104. The SAC device 200 communicates the signals to the user interface controller, as described. In some embodiments, the SAC device 200 communicates a signal corresponding to the stator angle to the user interface controller. At 312, the method 300 performs coordinate transformation on the forces and moments acting on the wheel 104 using the modified signal for wheel rotational position, as described.

In some embodiments, a wheel force transducer stator angle correction apparatus includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer. The apparatus also includes an encoder rigidly attached to a portion of a vehicle associated with the wheel, wherein the encoder is adapted to measure an angle of the stator rod and to adjust at least one value associated with a wheel speed of the wheel based on the measured angle of the stator rod.

In some embodiments the encoder is adapted to adjust a value associated with a wheel rotational position of the wheel based on the measured angle of the stator rod. In some embodiments, the encoder is adapted to intercept signals corresponding to three primary forces acting on the wheel.

In some embodiments, the encoder is adapted to intercept the at least one value associated with the wheel speed of the wheel. In some embodiments, the encoder is adapted to communicate a signal corresponding to the adjusted value associated with the wheel speed of the wheel and signals corresponding to the three primary force acting on the wheel to a user interface. In some embodiments, the apparatus includes a relative position mechanism adapted to zero-out the encoder. In some embodiments, the stator rod retainer is adapted to rotate relative to the encoder. In some embodiments, the encoder is in mechanical communication with a magnetic mount that rigidly attaches the encoder to the portion of the vehicle.

In some embodiments, a wheel force transducer stator angle correction system includes a load transducer adapted to measure at least one force acting on a corresponding wheel. The system also includes an encoder stator substantially vertically positioned and rigidly disposed proximate the load transducer. The system also includes a first rotary encoder rotatably attached to the wheel and adapted to measure at least one rotational position of the wheel using the encoder stator. The system also includes a stator rod retainer having a through-bore, the stator rode retainer being in mechanical communication with at least one bearing. The system also includes a stator rod having a first portion rigidly attached to the encoder stator and having a second portion disposed within the through-bore of the stator rod retainer. The system also includes a second rotary encoder rigidly attached to a portion of a vehicle associated with the wheel, wherein the encoder is adapted to measure a stator angle based on an angle of the stator rod and to adjust at least one value associated with a wheel speed of the wheel based on the stator angle.

In some embodiments, the second encoder is adapted to adjust a value associated with a wheel rotational position of the wheel based on the measured angle of the stator rod. In some embodiments, the second encoder is adapted to intercept signals corresponding to three primary forces acting on the wheel. In some embodiments, the second encoder is adapted to intercept the at least one value associated with the wheel speed of the wheel. In some embodiments, the system also includes a relative position mechanism adapted to zero-out the encoder. In some embodiments, the stator rod retainer is adapted to rotate relative to the second encoder. In some embodiments, the second encoder communicate a signal corresponding to the adjusted value associated with the wheel speed of the wheel to a user interface. In some embodiments, the second encoder is adapted to adjust at least one value associated with the rotational position of the wheel based on the stator angle.

In some embodiments, a wheel force transducer stator angle correction apparatus, includes a stator rod retainer having a through-bore, the stator rod retainer being in mechanical communication with at least one bearing. The apparatus also includes a stator rod having a first portion rigidly attached to an encoder stator attached to a wheel and having a second portion disposed within the through-bore of the stator rod retainer, the first portion of the stator rod is adapted to move with the encoder stator when the wheel is steered and wherein the second portion of the stator rod rotates the stator rod retainer when the wheel is steered. The apparatus also includes an encoder rigidly attached to a portion of a vehicle associated with the wheel, wherein the encoder is adapted to determine a stator angle based on an angle of the stator rod retainer relative to the encoder and to adjust at least one value associated with a wheel rotational position of the wheel based on the measured angle of the stator rod.

In some embodiments, the encoder is adapted to adjust a value associated with a wheel rotational position of the wheel based on the measured angle of the stator rod. In some embodiments, the apparatus also includes a relative position mechanism adapted to zero-out the encoder. In some embodiments, the stator rod retainer is adapted to rotate relative to the encoder.

As described above, it should be noted that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of apparatuses as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASIC s), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination. The terms "signal" and "data" are used interchangeably. Further, portions of the apparatuses do not necessarily have to be implemented in the same manner.

The aspects of the disclosure described herein can be described in terms of functional block components and various processing operations. The disclosed processes and sequences can be performed individually or in any combination. Functional blocks can be realized by any number of hardware and/or software components that perform the specified functions. For example, the described aspects can employ various integrated circuit components (e.g., memory elements, processing elements, logic elements, look-up tables, and the like), which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device, such as a hard disk drive, a memory device, a solid-state drive, a flash drive, or an optical drive. Other suitable mediums are also available. Such computer-usable or computer-readable media can be referred to as non-transitory memory or media. Unless otherwise specified, a memory of an apparatus described herein does not have to be physically contained in the apparatus, but can be a memory that can be accessed remotely by the apparatus, and does not have to be contiguous with other memory that might be physically contained by the apparatus.

Any of the individual or combined functions described herein as being performed as examples of the disclosure can be implemented using machine-readable instructions in the form of code for the operation of any or any combination of the aforementioned computational hardware. The computational code can be implemented in the form of one or more devices by which individual or combined functions can be performed as a computational tool, the input and output data of each device being passed to/from one or more further devices during operation of the methods, apparatuses, and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, electronics, control systems, software development, and other functional aspects of the systems (and components of the individual operating components of the systems) cannot be described in detail herein. Furthermore, the connecting lines or connectors shown in the various figures presented are intended to represent exemplary functional relationships and/or physical or logical couplings between the various elements. Many alternative or additional functional relationships, physical connections, or logical connections can be present in a practical device.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout this disclosure is not intended to mean the same aspect or implementation unless described as such.

The use of "including" or "having" and variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by the context. The use of any and all examples, or exemplary language (e.g., "such as") provided herein, is intended merely to better illuminate the disclosure and does not pose a limitation on the scope of the disclosure unless otherwise claimed.

It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the word "if" as used herein can be interpreted as "when," "while," or "in response to."

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus, comprising:
 a mounting bracket configured for fixed attachment to a vehicle in a position spaced apart from a wheel of a vehicle, the mounting bracket supporting a housing;
 a first rotary encoder mounted within the housing;
 a stator rod retainer aligned with a rotational axis of the first rotary encoder and having a through-bore extending perpendicular to the rotational axis, wherein the stator rod retainer is in mechanical communication with at least one bearing for rotation relative to a stationary portion of the first rotary encoder, and the stator rod retainer is configured to support a first end of a stator rod for substantially free movement through the through-bore;
a controller associated with the first rotary encoder configured to determine, when a second end of the stator rod is fixedly attached to an encoder stator attached to the wheel and the first end extends through the through-bore, a stator angle of the stator rod for adjusting at least one value associated with the wheel that is measured using the encoder stator; and
a second rotary encoder that includes the encoder stator and the stator rod, wherein the mounting bracket is fixed to the vehicle in a substantially vertical position, and the housing is secured to the mounting bracket using longitudinally-extending adjustable brackets such that a position of the first rotary encoder relative to the vehicle is adjustable.

2. The apparatus of claim 1, wherein the at least one value comprises a measured speed of the wheel, a measured rotational position of the wheel, or both the measured speed and the measured rotational position.

3. The apparatus of claim 1, further comprising:
a communication port extending through the housing, wherein the controller is configured to transmit the adjusted at least one value associated with the wheel through the communication port.

4. The apparatus of claim 1, wherein the controller is a first controller, the apparatus further comprising:
a second rotary encoder that includes the encoder stator, the second rotary encoder including a second controller having a user interface, wherein the second controller is configured to receive the stator angle from the first controller and to adjust measured force and moments using the stator angle.

5. The apparatus of claim 1, further comprising:
a relative position mechanism that, when activated, adjusts the rotary encoder to account for a current position of the stator rod retainer.

6. The apparatus of claim 1, wherein the stator rod retainer includes a cantilever sheet metal spring extending into the through-bore to control movement of the stator rod in the through-bore.

7. The apparatus of claim 1, wherein the rotary encoder is a first rotary encoder, the apparatus further comprising:
a load transducer that measures at least one force acting on the wheel, wherein the encoder stator is substantially vertically positioned and rigidly disposed proximate the load transducer;
a second rotary encoder rotatably attached to the wheel to measure a rotational position of the wheel using the encoder stator, wherein the stator rod is rigidly attached to the encoder stator; and
a second controller associated with the second rotary encoder, the second controller configured to receive the stator angle from the first encoder and adjust the at least one force acting on the wheel using the stator angle.

8. The apparatus of claim 1, wherein the stator rod retainer includes a cantilever sheet metal spring extending into the through-bore, the cantilever sheet metal spring allowing the stator rod to move within the through-bore to accommodate a change in distance between the encoder stator and the stator rod retainer resulting from steering movement of the wheel.

9. An apparatus, comprising:
a mounting bracket configured for fixed attachment to a vehicle in a position spaced apart from a wheel of a vehicle, the mounting bracket supporting a housing;
a rotary encoder mounted within the housing;
a stator rod retainer aligned with a rotational axis of the rotary encoder and having a through-bore extending perpendicular to the rotational axis, wherein the stator rod retainer is in mechanical communication with at least one bearing for rotation relative to a stationary portion of the rotary encoder, and the stator rod retainer is configured to support a first end of a stator rod for substantially free movement through the through-bore;
a controller associated with the rotary encoder configured to determine, when a second end of the stator rod is fixedly attached to an encoder stator attached to the wheel and the first end extends through the through-bore, a stator angle of the stator rod for adjusting at least one value associated with the wheel that is measured using the encoder stator;
a communication port extending through the housing; and
a communications cable connectable to a load transducer of a second rotary encoder that includes the encoder stator, wherein the controller is configured to receive forces and moments acting on the wheel from the load transducer through the communication port via the communications cable.

10. The apparatus of claim 9, wherein the controller is configured to:
receive a measured speed of the wheel and a measured rotational position of the wheel from the second rotary encoder.

11. The apparatus of claim 9, wherein:
the controller is a first controller;
the communication port is a first communication port;
the communications cable is a first communications cable; and
the apparatus further comprises:
a second communication port extending through the housing; and
a second communications cable connectable to a second controller, wherein the first controller is configured to transmit the forces and moments acting on the wheel received from the load transducer to the second controller without modification.

12. The apparatus of claim 9, wherein the rotary encoder is a first rotary encoder, and the apparatus further comprises:
a second rotary encoder that includes the encoder stator and the stator rod, wherein the mounting bracket is fixed to the vehicle in a substantially vertical position, and the housing is secured to the mounting bracket using longitudinally-extending adjustable brackets such that a position of the first rotary encoder relative to the vehicle is adjustable.

13. The apparatus of claim 9, further comprising:
a relative position mechanism that, when activated, adjusts the rotary encoder to account for a current position of the stator rod retainer.

14. A method, comprising:
determining, using a first controller associated with a rotary encoder, a stator angle of a stator rod, wherein:
the rotary encoder is mounted within a housing supported by a mounting bracket,
the mounting bracket is fixedly attached to a vehicle in a position spaced apart from a wheel of a vehicle,
a stator rod retainer is aligned with a rotational axis of the rotary encoder and has a through-bore extending perpendicular to the rotational axis,
the stator rod retainer is in mechanical communication with at least one bearing for rotation relative to a stationary portion of the rotary encoder, the stator rod retainer supports a first end of the stator rod for substantially free movement through the through-bore, and a second end of the stator rod is fixedly attached to an encoder stator attached to the wheel;

adjusting, using the stator angle, at least one value associated with the wheel that is measured using the encoder stator;

transmitting, from the first controller and to a second controller, the adjusted at least one value associated with the wheel and the stator angle;

receiving, at the first controller, forces and moments acting on the wheel, forces and moments measured by a wheel force transducer of a second rotary encoder that includes the encoder stator;

transmitting, from the first controller and to the second controller, the forces and the moments without modification; and adjusting, using the second controller, the forces and the moments using the stator angle.

15. The method of claim 14, wherein adjusting the at least one value comprises adjusting a measured speed of the wheel, adjusting a measured rotational position of the wheel, or adjusting both the measured speed and the measured rotational position.

16. The method of claim 14, further comprising:

receiving a measured speed of the wheel and a measured rotational position of the wheel from the second rotary encoder, wherein the at least one value comprises the measured speed and the measured rotational position.

17. The method of claim 14, wherein:

the mounting bracket is fixed to the vehicle in a substantially vertical position, the mounting bracket includes longitudinally-extending adjustable brackets, and the method further comprises adjusting a position of the rotary encoder relative to the vehicle using the adjustable brackets.

18. The method of claim 14, further comprising:

measuring, using a wheel force transducer, forces and moments acting on the wheel using a wheel coordinate system, wherein the encoder stator is substantially vertically positioned and rigidly disposed proximate the wheel force transducer;

measuring a rotational position of the wheel;

adjusting the at least one value comprises adjusting the measured rotational position using the stator angle to obtain an adjusted rotational position; and after adjusting the measured rotational position, performing coordinate transformation on the measured forces and moments using the adjusted rotational position.

19. The method of claim 18, further comprising:

measuring a speed of the wheel; and adjusting the at least one value comprises adjusting the measured speed using the stator angle.

20. The method of claim 14, further comprising:

activating a relative position mechanism to zero-out the rotary encoder to account for a current position of the stator rod retainer.

* * * * *